(No Model.)
B. S. WASH.
FIRE GRATE.
No. 277,526. Patented May 15, 1883.
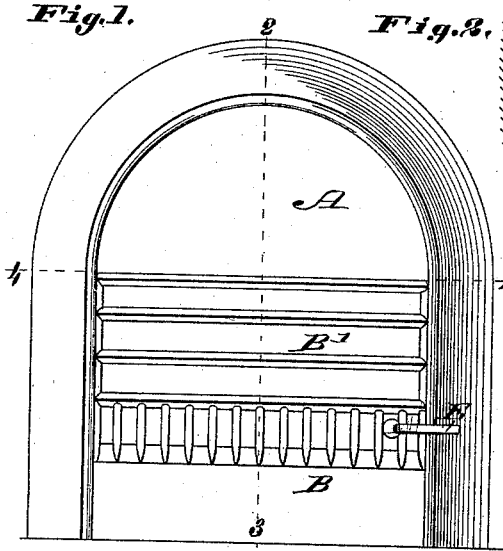
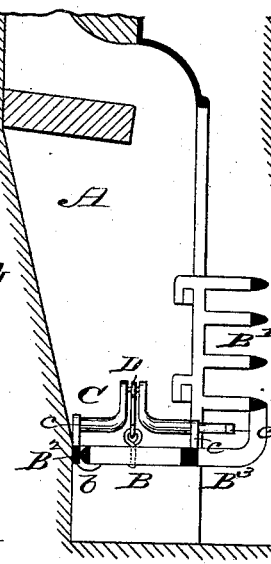
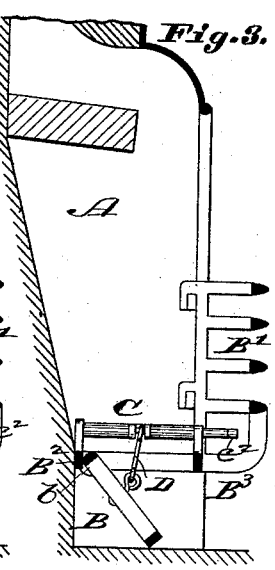
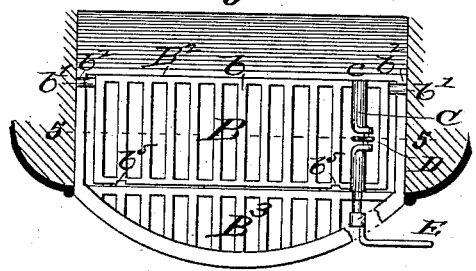
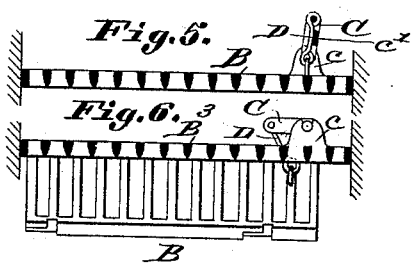
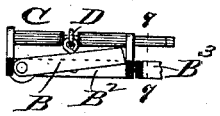
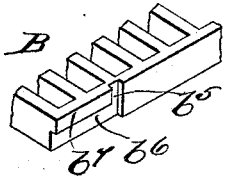
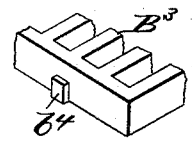
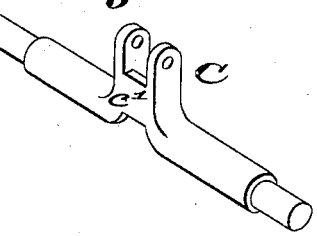
Attest:
C. D. Moody
Charles Pickles
Inventor:
Benjamin S. Wash

UNITED STATES PATENT OFFICE.

BENJAMIN S. WASH, OF ST. LOUIS, MISSOURI.

FIRE-GRATE.

SPECIFICATION forming part of Letters Patent No. 277,526, dated May 15, 1883.

Application filed December 26, 1882. (No model.)

*To all whom it may concern:*

Be it known that I, BENJAMIN S. WASH, of St. Louis, Missouri, have made a new and useful Improvement in Fire-Grates, of which the following is a full, clear, and exact description, reference being had to the annexed drawings, making part of this specification, in which—

Figure 1 is a front elevation of a grate having the improvement in question; Fig. 2, a vertical section on the line 2 3 of Fig. 1; Fig. 3, a similar section, the grate being dumped; Fig. 4, a horizontal section on the line 4 4 of Fig. 1; Fig. 5, a vertical section on the line 5 5 of Fig. 4; Fig. 6, a vertical section on the line 7 7 of Fig. 8, the grate being dumped; Fig. 7, a vertical section on the line 7 7 of Fig. 8, the grate being raised as when being shaken; Fig. 8, a section taken on the line 8 8 of Fig. 8; Figs. 9 and 10, details in perspective, showing, respectively, portions of the movable and fixed parts of the grate; and Fig. 11, a view in perspective of the crank used in operating the grate.

The same letters denote the same parts.

The present invention is an improvement more especially in open fire-grates; but it can in part be employed in stoves and other furnaces.

Making the grate-bottom or the principal portion of the bottom a separate piece from the remainder of the basket, and journaling or hinging it at its rear edge, so that it can be dumped from its rear edge by a peculiar mechanism, is a feature of the improvement. An additional feature is the means for dumping and for shaking the grate. The improvement also relates to the mode of supporting the grate when raised to the rest for the live coals, and to the various parts of the construction in combination.

A represents an open fire-grate in which the present improvement is embodied. Aside from the improvement, the grate is of the usual construction.

B represents the grate-bottom, or rather, as shown in the drawings, the main portion of the grate-bottom. It is made a separate piece from the remainder, B', of the grate. At or near its rear edge, $b$, the bottom B is provided with journals $b'$ $b'$, which turn in bearings $b^2$ $b^2$. The bearings are in a fixed part of the construction, and preferably in the frame $B^2$, which extends from the front of the grate inwardly and so as to surround the bottom B. The bottom B can be turned in the bearings $b^2$ $b^2$ from the horizontal position shown in Fig. 2 downward into a position shown in Fig. 3, to dump the contents of the grate downward and well toward the front of the grate. The bottom B is raised and lowered by means of the crank C and link D. The crank is adapted to turn in the fixed bearings $c$ $c$. The link D is jointed at one end to the crank and at the other end to the bottom B. As the bottom, in dumping, swings backward as well as downward, the connection of the link with the crank and with the bottom must be such as to enable the link to accommodate itself to the varying position of the bottom. To raise the bottom the crank is turned from the horizontal position shown in Fig. 6 upward into the vertical position shown in Fig. 7. To uphold the bottom after raising it the crank should be swung a little past the perpendicular, and then kept from swinging farther. To this end the crank might be made to lean against the wall or other fixture at the end of the grate; but the preferable means for accomplishing this is that shown in Figs. 5, 11. The crank, as seen, is provided with a cross-bar, $c'$, against which the link bears after the crank has been swung past the perpendicular. This at once locks the crank and prevents it from turning farther unless the bottom is forcibly lifted above a horizontal position, as indicated in Figs. 7, 8. This can be and is done when it is desired to shake the grate, for the same means—namely, the crank and link—is employed to shake the grate as to dump it, and as follows: The crank is turned from its nearly-upright position farther over and down into the position shown in Figs. 7, 8, and then to agitate the bottom B the crank is vibrated between these two positions last named, the turning down of the crank into the position shown in Fig. 7 operating to move the bottom B endwise to the left, as shown in Fig. 7, and the turning up of the crank operating to move the bottom to the right. The crank should be suitably located so as not to encounter, in the movements described, the end wall of the grate. The bottom B, as stated, can be upheld by the crank and link only. It is better, however, to employ an auxiliary support. For this purpose the stationary part $B^3$ of the grate-bottom is provided with a lug, $b^4$, and the movable part B is slotted at $b^5$ $b^6$ and furnished with the projection $b^7$. The bottom B, in rising, first moves directly upward, during which the slot $b^5$ comes opposite the lug $b^4$. This continues until the crank is approaching an upright position. The crank then, in its further movement into the position a little past the perpendicular, operates to draw the bottom B endwise, and so as to bring the projection $b^7$ over the lug $b^4$, upon which the bottom is now allowed to rest. Other lugs may be similarly used at other parts of the bottom B, and the bottom can thus be evenly and fully supported. The lug $b^4$ might be on the part B, and the part $B^3$ have the slot $b^5$ $b^6$ and projection $b^7$. So far as dumping the grate is concerned, the part $B^3$ might be included in the part B. It is better, however, to have a portion of the grate-bottom stationary, as shown, as thereby a rest is provided for the live coals, which can be raked and left thereupon while the dead portion of the contents of the grate is being dumped. The crank C is suitably squared at $c^2$, to enable a wrench, E, to be applied to the crank.

I claim—

1. The combination of the dumping bottom B, the link D, and the crank C, substantially as described.

2. The combination of the dumping bottom B, the link D, and the crank C, having the shoulder $c'$, as and for the purpose described.

3. The combination of the dumping bottom B, slotted at $b^5$ $b^6$, and having the projection $b^7$, and the fixed bottom $B^3$, having the lug $b^4$, as and for the purpose described.

4. The combination, in an open fire-grate, of the dumping and endwise-movable bottom B, the fixed bottom $B^3$, the crank C, the fixed bearings $c$ $c$, and the link D, as and for the purposes described.

Witness my hand.

BENJAMIN S. WASH.

Witnesses:
C. D. MOODY,
SAML. S. BOYD.